US012560550B2

(12) United States Patent
Thornell

(10) Patent No.: US 12,560,550 B2
(45) Date of Patent: Feb. 24, 2026

(54) PHOTO RESPONSE NON-UNIFORMITY CORRECTION DURING SEMICONDUCTOR INSPECTION

(71) Applicant: Onto Innovation Inc., Wilmington, MA (US)

(72) Inventor: John M. Thornell, Richardson, TX (US)

(73) Assignee: Onto Innovation Inc., Wilmington, MA (US)

( * ) Notice: Subject to any disclaimer, the term of this patent is extended or adjusted under 35 U.S.C. 154(b) by 154 days.

(21) Appl. No.: 18/217,359

(22) Filed: Jun. 30, 2023

(65) Prior Publication Data

US 2025/0003888 A1    Jan. 2, 2025

(51) Int. Cl.
*G01N 21/88* (2006.01)
*G01N 21/95* (2006.01)
*G06T 7/564* (2017.01)

(52) U.S. Cl.
CPC ..... *G01N 21/8851* (2013.01); *G01N 21/9501* (2013.01); *G06T 7/564* (2017.01);
(Continued)

(58) Field of Classification Search
CPC .......... G01N 21/8851; G01N 21/9501; G01N 2021/8864; G01N 2021/8883;
(Continued)

(56) References Cited

U.S. PATENT DOCUMENTS

2008/0174771 A1 * 7/2008 Yan ..................... G01N 21/8901
356/237.5
2018/0293721 A1 * 10/2018 Gupta .................... G06N 3/045
(Continued)

FOREIGN PATENT DOCUMENTS

TW        202025132        7/2020
WO        2025006781       3/2025

OTHER PUBLICATIONS

"Taiwanese Application Serial No. 113124349, Office Action mailed Apr. 2, 2025", with English search report, 10 pages.
(Continued)

*Primary Examiner* — Tarifur R Chowdhury
*Assistant Examiner* — Akbar H. Rizvi
(74) *Attorney, Agent, or Firm* — Schwegman Lundberg & Woessner, P.A.

(57) ABSTRACT

Image sensors assist in inspecting semiconductor substrates, including semiconductor wafers, during the semiconductor manufacturing process. However, due to the non-uniformity of cells between image sensors, which is referred to as photo response non-uniformity (PRNU), each image sensor can generate a different voltage level when illuminated with a uniform light source, which leads to a luminance inaccuracy at the pixel level that is referred to as photo response non-uniformity (or illumination flat fielding). Photo response non-uniformity (PRNU) can be corrected using a system calibration that calibrates to a substrate, including wafers, for a given illumination condition, objective, and camera. The PRNU correction is then applied to all images acquired with the given setup to produce a uniform image. Techniques are described to correct the PRNU at runtime even when there is a contour, e.g., tilt or warp, in the substrate as it relates to the normal axis of the optics.

20 Claims, 9 Drawing Sheets

(52) U.S. Cl.
CPC ............... *G01N 2021/8864* (2013.01); *G01N 2021/8883* (2013.01); *G01N 2021/8887* (2013.01); *G06T 2207/20081* (2013.01)

(58) Field of Classification Search
CPC ............ G01N 2021/8887; G06T 7/564; G06T 2207/20081; G06T 2207/30148; G06T 5/90; G06T 7/0004; G06T 5/80; G06T 15/04; G06T 11/40; G06T 2207/30004; G06T 7/0012; G06T 7/75; G06T 15/10; G06T 2200/04; G06T 15/506; G06T 1/00; G06T 2207/10032; G06T 2207/10152; G06T 2207/20021; G06T 2207/30181; G06T 5/50; G06T 5/94; G06T 7/33; G06T 7/35; G06T 7/593; G06T 7/85; G06T 13/20; G06T 15/08; G06T 15/20; G06T 15/205; G06T 17/00; G06T 17/05; G06T 19/00; G06T 19/006; G06T 2207/10021; G06T 2215/16; G06T 3/047; G01V 1/308; G01V 1/38; G01V 1/3808; G01V 1/3817; G01V 1/3843; G01V 1/3861; G01V 1/28; G01V 1/307; G01V 1/00; G01V 1/003; G01V 1/02; G01V 1/32; G01V 1/364; G01V 20/00; G01V 1/282; G01V 1/306; G01V 1/345; G01V 1/50; G01V 2210/51; G01V 2210/57; G01V 2210/62; G01V 2210/632; G01V 2210/66; G01V 2210/667; G01V 99/00
See application file for complete search history.

(56) References Cited

U.S. PATENT DOCUMENTS

| | | | |
|---|---|---|---|
| 2019/0004418 A1 | 1/2019 | Jeong | |
| 2020/0356011 A1* | 11/2020 | Su | ........................... G06N 20/00 |
| 2022/0334497 A1* | 10/2022 | Pandey | ............... G03F 7/70633 |
| 2023/0204339 A1* | 6/2023 | Bublitz | .............. G01B 9/02094 |
| | | | 356/457 |
| 2023/0205014 A1* | 6/2023 | Zhao | .................... G09G 3/3607 |
| | | | 349/56 |

OTHER PUBLICATIONS

"International Application Serial No. PCT US2024 035872, International Search Report mailed Sep. 20, 2024", 2 pgs.
"International Application Serial No. PCT US2024 035872, Written Opinion mailed Sep. 20, 2024", 4 pgs.
"Taiwanese Application Serial No. 113124349, Response filed Jul. 2, 2025 to Office Action mailed Apr. 2, 2025", with manual English translation, 19 pages.
"Taiwanese Application Serial No. 113124349, Office Action mailed Oct. 14, 2025", with manual English translation, 21 pages.

* cited by examiner

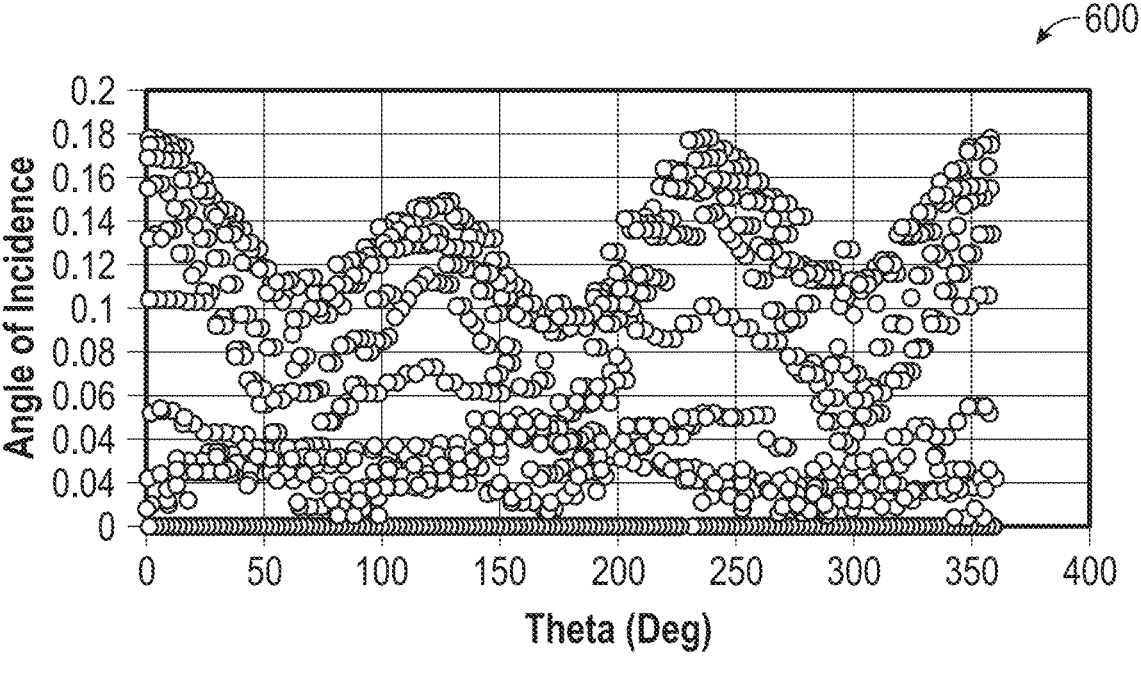
FIG. 6
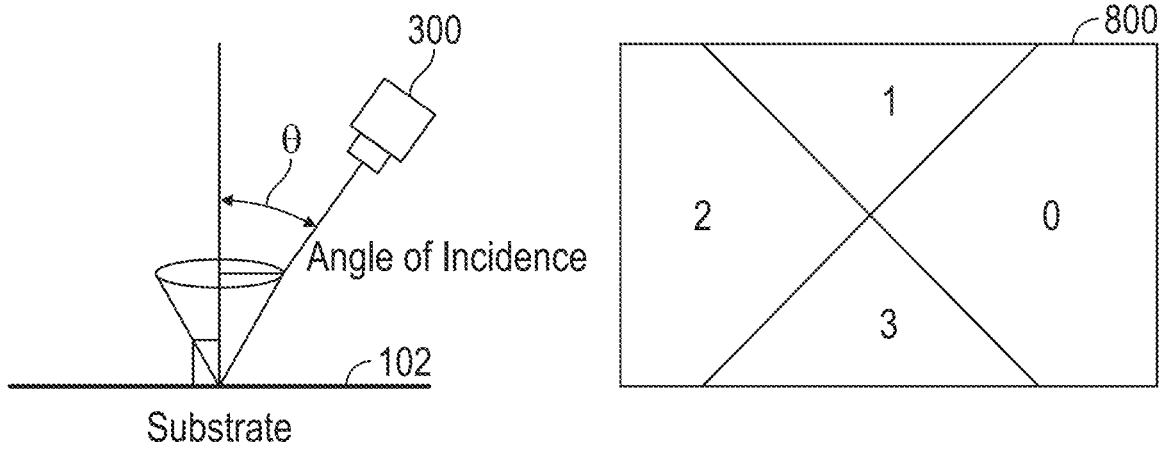
FIG. 7
FIG. 8

Angle of Incidence

1500

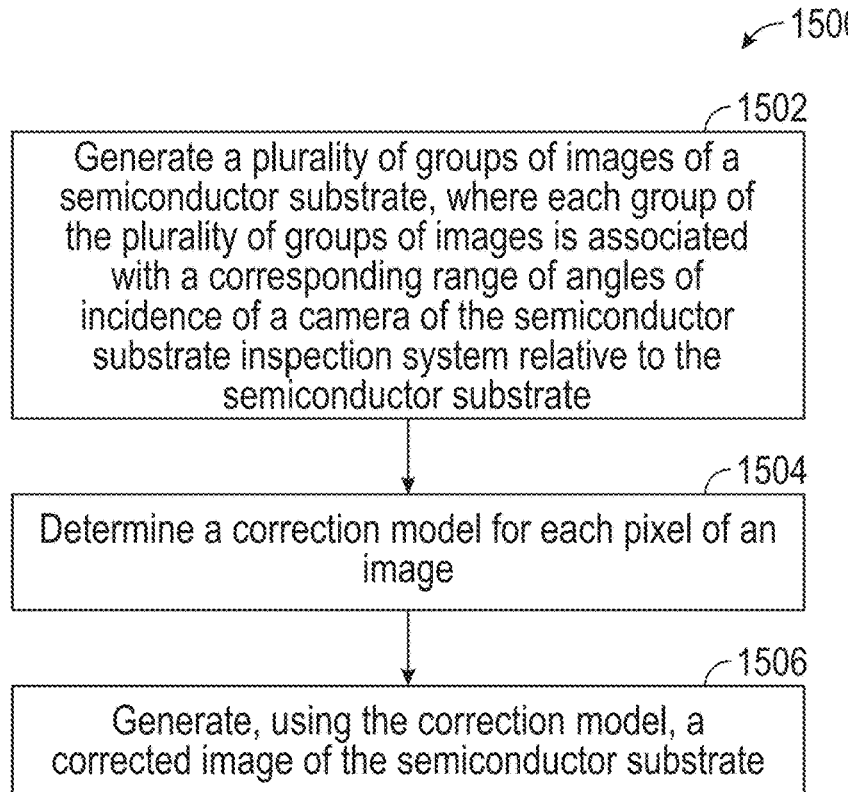

1502

Generate a plurality of groups of images of a semiconductor substrate, where each group of the plurality of groups of images is associated with a corresponding range of angles of incidence of a camera of the semiconductor substrate inspection system relative to the semiconductor substrate

1504

Determine a correction model for each pixel of an image

1506

Generate, using the correction model, a corrected image of the semiconductor substrate

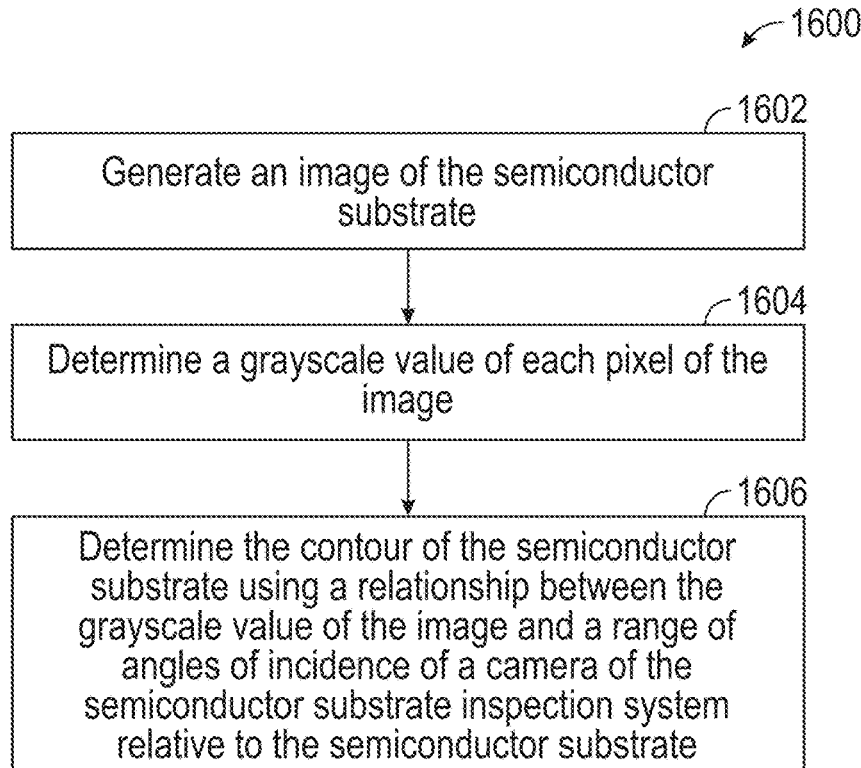

1602

Generate an image of the semiconductor substrate

1604

Determine a grayscale value of each pixel of the image

1606

Determine the contour of the semiconductor substrate using a relationship between the grayscale value of the image and a range of angles of incidence of a camera of the semiconductor substrate inspection system relative to the semiconductor substrate

FIG. 16

PHOTO RESPONSE NON-UNIFORMITY CORRECTION DURING SEMICONDUCTOR INSPECTION

FIELD OF THE DISCLOSURE

This disclosure relates generally to semiconductor devices and more particularly to techniques for inspection of semiconductor devices.

BACKGROUND

Semiconductor devices are an essential component of modern electronic and computing devices. Semiconductor devices are electronic components that exploit the electrical properties of semiconductor materials. The electrical conductivity of semiconductor materials can be manipulated by the introduction of an electric or magnetic field. Improvements in the manufacturing process have resulted in exponential improvements in the size, speed, and cost of semiconductor devices.

In a typical semiconductor manufacturing process, bare substrates, such as substrates, panels, and wafers, are processed using lithographic techniques to create circuitry thereon. These substrates with circuitry are often separated into smaller pieces known as die. These die form the basis of common electronic devices.

SUMMARY OF THE DISCLOSURE

Image sensors assist in inspecting semiconductor substrates, including semiconductor wafers, during the semiconductor manufacturing process. However, due to the non-uniformity of cells between image sensors, which is referred to as photo response non-uniformity (PRNU), each image sensor can generate a different voltage level when illuminated with a uniform light source, which leads to a luminance inaccuracy at the pixel level that is referred to as photo response non-uniformity (or illumination flat fielding). Photo response non-uniformity (PRNU) can be corrected using a system calibration that calibrates to a substrate, including wafers, for a given illumination condition, objective, and camera. The PRNU correction is then applied to all images acquired with the given setup to produce a uniform image. This disclosure describes techniques to correct the PRNU at runtime even when there is a contour, e.g., tilt or warp, in the substrate as it relates to the normal axis of the optics.

In some aspects, this disclosure is directed to a method of determining of a contour of a semiconductor substrate using a semiconductor substrate inspection system, comprising: generating an image of the semiconductor substrate; determining a grayscale value of each pixel of the image; and determining the contour of the semiconductor substrate using a relationship between the grayscale value of the image and a range of angles of incidence of a camera of the semiconductor substrate inspection system relative to the semiconductor substrate.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 is a simulation depicting a scatterplot of angles of incidence for a substrate.

FIG. 7 graphically depicts the polar coordinate angle theta.

FIG. 8 is a conceptual drawing depicting an example of a grouping of polar coordinate angles.

FIG. 15 depicts a flow diagram of another example of a method of correcting a semiconductor substrate inspection system, in accordance with various techniques of this disclosure.

FIG. 16 depicts a flow diagram of an example of a method of determining of a contour of a semiconductor substrate using a semiconductor substrate inspection system.

DETAILED DESCRIPTION

Image sensors assist in inspecting semiconductor substrates, including semiconductor wafers, during the semiconductor manufacturing process. However, due to the non-uniformity of cells between image sensors, each image sensor can generate a different voltage level when illuminated with a uniform light source, which leads to a luminance inaccuracy at the pixel level that is referred to as photo response non-uniformity (or illumination flat fielding).

Photo response non-uniformity (PRNU) can be corrected using a system calibration that calibrates to a substrate, including wafers, for a given illumination condition, objective, and camera. The PRNU correction is then applied to all images acquired with the given setup to produce a uniform image.

The present inventor has recognized that a contour, e.g., tilt or warp, in the substrate as it relates to the normal axis of the optics can create different responses. Optically speaking this is due to the pupil shifting with different angular inputs, but practically speaking it manifests itself as different PRNU as a function of a substrate angle to the optics.

To make matters more complicated, the angle is constantly changing as the substrate is inspected. Imagine looking top down on a mountain. The angle of the mountain surface is different for every image as the surface area is rastered. The present inventor has recognized a need to correct a semiconductor substrate inspection system due to the contour, e.g., tilt, in the semiconductor substrate.

This disclosure describes techniques for dynamically correcting the PRNU at runtime based on a) a PRNU model of how imaging responds to tilt in a customer substrate; and b) the measured tilt by using a point sensor that maps the contour (e.g., once per recipe, lot, or substrate). This contour map establishes the angle of the substrate relative to the optics.

Figure 1:
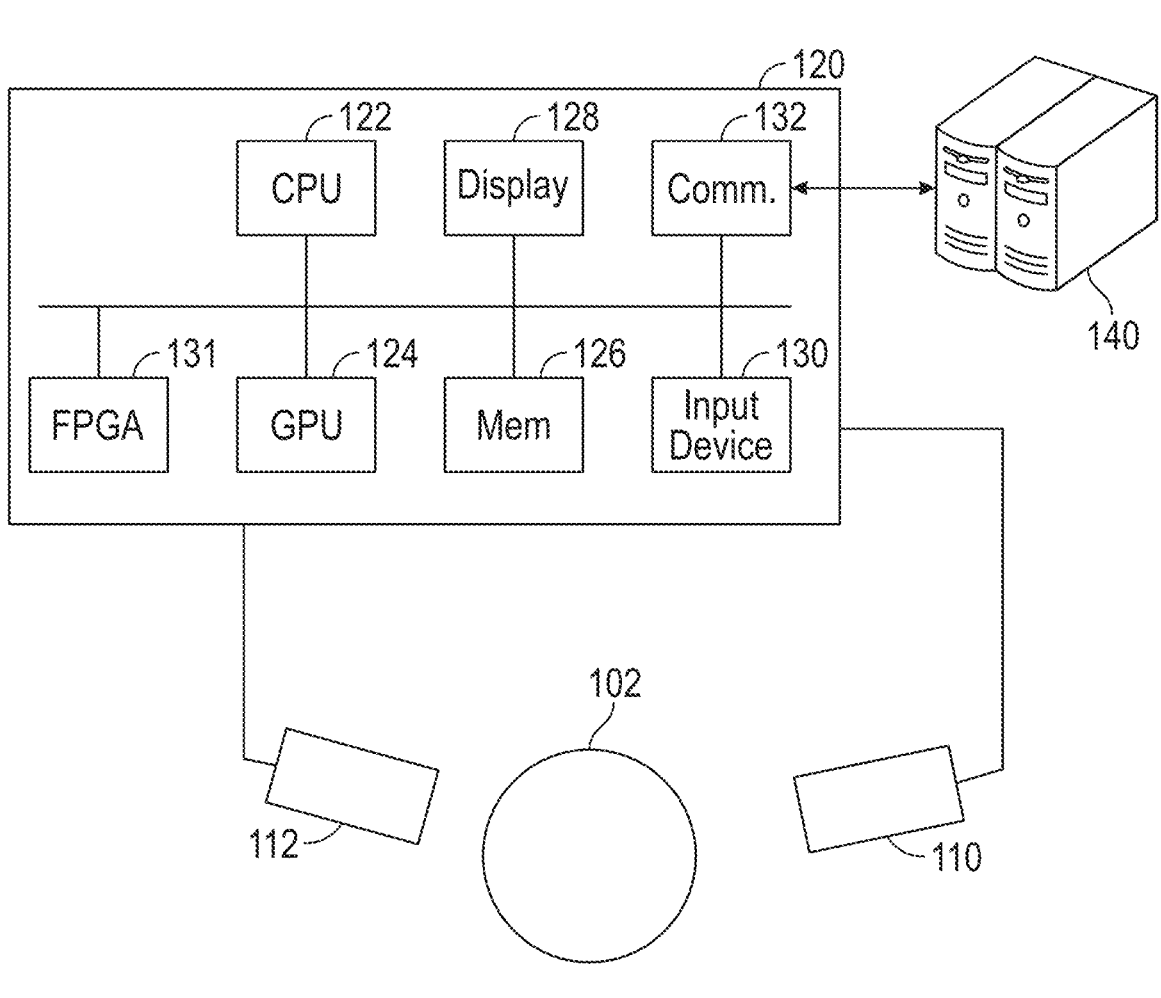
FIG. 1 illustrates example portions of a fabrication system, which can be used to perform one or more techniques showed and described herein.

FIG. 1 illustrates example portions of a fabrication system 100, which can be used to perform one or more techniques showed and described herein. The fabrication system 100 can be used for manufacturing and inspecting a substrate 102, such as a semiconductor device.

The fabrication system 100 can include one or more tools 110 (also referred to as machines) to perform a processing step on the substrate 102, e.g., semiconductor wafer, for fabrication. In some examples, the tool 110 can include a chemical vapor deposition (CVD) machine for depositing one or more layers on the substrate 102. In some examples, the tool 110 can include a polishing tool for performing CMP, an illumination source to emit a beam of radiation (e.g., electromagnetic waves) projecting onto the substrate 102 for photolithography, a plating tool for plating the substrate and/or other suitable tools for semiconductor fabrication.

The fabrication system 100 can include a metrology instrument 112 (also referred to as inspection instrument) to measure various features on or characteristics of the substrate 102. The various features and characteristics can comprise, for example, film thickness measurements, critical-dimensions (CD) measurements (in x-dimensions, y-dimensions, and/or z-dimensions) of features formed on a substrate, a pitch of line-space features formed on a substrate, an overlay offset from one layer to another on the substrate, or a number of other measurements or characteristics known to a person of ordinary skill in the art. The inspection instrument can be used to check for compliance of features formed on or otherwise found on a substrate. For example, the inspection can be of a substrate upon which integrated circuit dice have been fabricated, locations of the dice, locations of unwanted particulate matter or other unwanted or unplanned features, and so on.

The tool 110 and metrology instrument 112 can be coupled to a control system 120. The control system 120 can include a computer processing unit (CPU) 122, a graphic processing unit (GPU) 124, a field programmable gate array (FPGA) 131 (or other suitable accelerators such as a data processing unit (DPU), RNN, artificial neuron network (ANN) and the like), a memory 126, a display 128, an input device 130, and a communication interface 132 (e.g., high performance network (HPC)). The control system 120 can also include front-end circuitry such as transmit signal chains, receive signal chains, switch circuitry, digital and analog circuitry, etc. The transmit signal chain can provide control signals for the tool 110. The receive signal chain can receive process parameter measurements from the metrology instrument 112.

The front-end circuitry can be coupled to and controlled by one or more processor circuits, such as the CPU 122, GPU 124, and FPGA 131. The CPU 122 can be provided as one or more multi-core processors. The GPU 124 and FPGA 131 can be used to accelerate the processing of data and the performance of the machine learning network as described herein. The techniques shown and described herein can be executed by the CPU 122 working in conjunction with the GPU 124 for faster processing.

The CPU 122 and GPU 124 can be coupled to the memory 126, such as to execute instructions that cause the control system 120 to perform one or more of manufacturing control, processing, or storage of data relating to inspection, or to otherwise perform techniques as shown and described herein. The control system 120 can be communicatively coupled to other portions of the system 100, such as using a wired or wireless communication interface 132.

For example, performance of one or more techniques as shown and described herein can be accomplished on-board the control system 120 or using other processing or storage facilities such as using a compute facility 140 (e.g., a general-purpose computing device such as a server, cloud processing system, data warehouse, laptop, tablet, smartphone, desktop computer, or the like). For example, processing tasks that would be undesirably slow if performed on-board the control system 120 or beyond the capabilities of the control system 120 can be performed remotely (e.g., on a separate system), such as in response to a request from the control system 120. Similarly, storage of inspection data or intermediate data can be accomplished using remote facilities communicatively coupled to the control system 120. The control system 120 can also include the display 128, such as for presentation of configuration information or results, and the input device 130 such as including one or more of a keyboard, trackball, function keys or soft keys, mouse-interface, touchscreen, stylus, or the like, for receiving operator commands, configuration information, or responses to queries.

Figure 2:
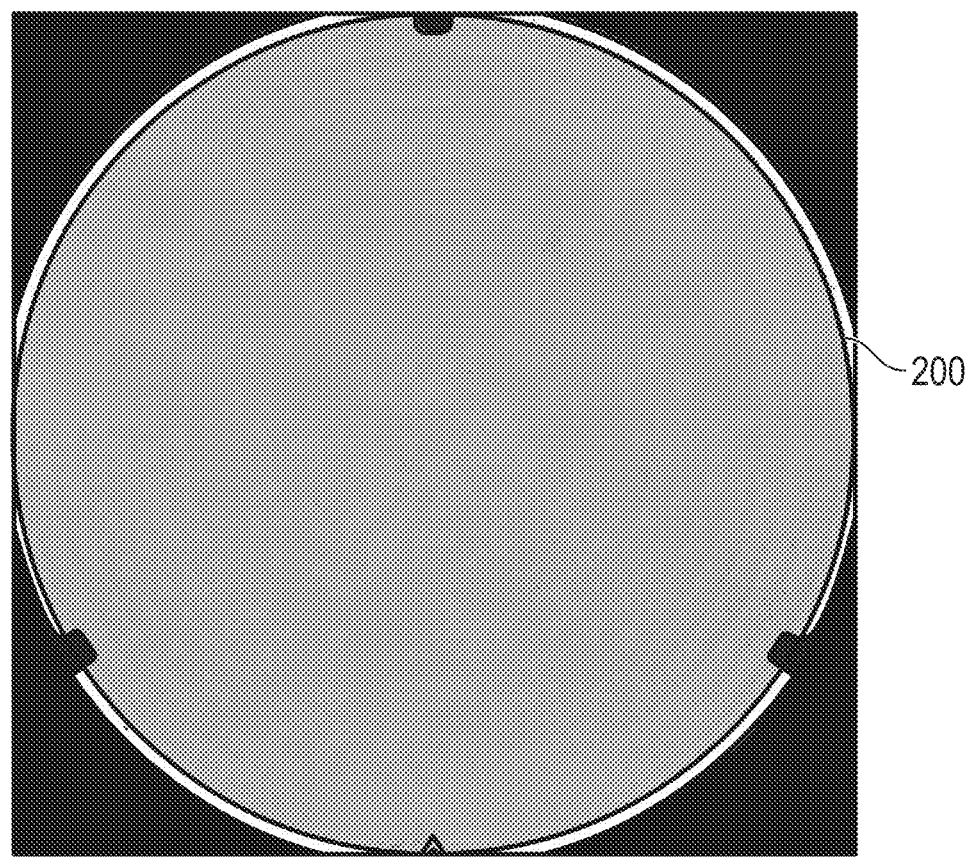
FIG. 2 depicts an example of a composite image of the substrate of FIG. 1.

FIG. 2 depicts an example of a composite image 200 of the substrate 102 of FIG. 1. During inspection, the metrology instrument 112 of FIG. 1 spins the substrate 102 and an inspection camera, shown in FIG. 3, captures images of the substrate 102 along a first circular path within the field of view of the inspection camera. Then, a robotic mechanism can index the inspection camera such that it moves radially, e.g., inward toward the center of the substrate 102, so that the inspection camera can capture images of the substrate 102 along a second circular path. Eventually, the inspection camera captures images of the entire substrate 102 and the metrology instrument 112 can use the captured images to generate the composite image 200 shown in FIG. 2.

Figure 3:
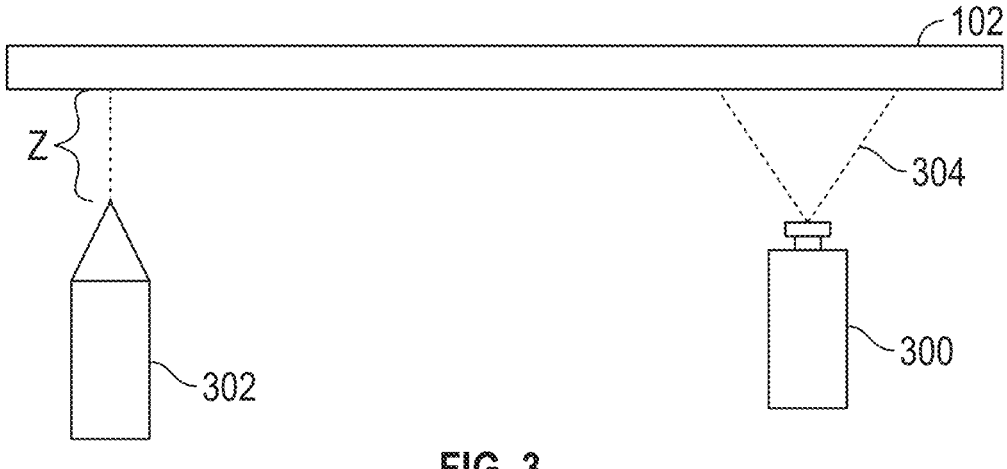
FIG. 3 is a side view of the substrate of FIG. 1.

FIG. 3 is a side view of the substrate 102 of FIG. 1. FIG. 3 depicts portions of the metrology instrument 112 of FIG. 1, including an inspection camera 300 and a sensor 302. In a non-limiting example, there can be two million pixels per image captured by the inspection camera 300. The inspection camera 300 has a field of view 304. Although shown positioned below the substrate 102, the inspection camera 300 and the sensor 302 can be positioned above the substrate 102. In other examples, the metrology instrument 112 is a double-side inspection instrument and, as such, an inspection camera 300 and a sensor 302 can be positioned on both sides of the substrate 102. The term "substrate" refers to semiconductor substrates, panels, and wafers as these techniques are applicable to all of these particular examples of semiconductor structures.

The magnification of the metrology instrument 112 dictates how many images the inspection camera 300 captures. In some examples, the inspection camera 300 can capture 700-800 images that the control system 120 can use to generate the composite image 200 of FIG. 2 for display on the display 128.

The control system 120 can control the sensor 302, e.g., a point sensor, to measure a Z-distance to the substrate 102. Based on the Z-distance determined using the sensor 302, the control system 120 can generate a contour map (or topographic) of the substrate 102, such as for display on the display 128. The contour map illustrates the tilt of the substrate 102 at each point measured by the sensor 302. Like a topographic map, the contour map can show the changes in height and the steepness of slopes of the substrate 102 due the warping of the substrate 102. An example of a contour map is shown in FIG. 4.

Figure 4:
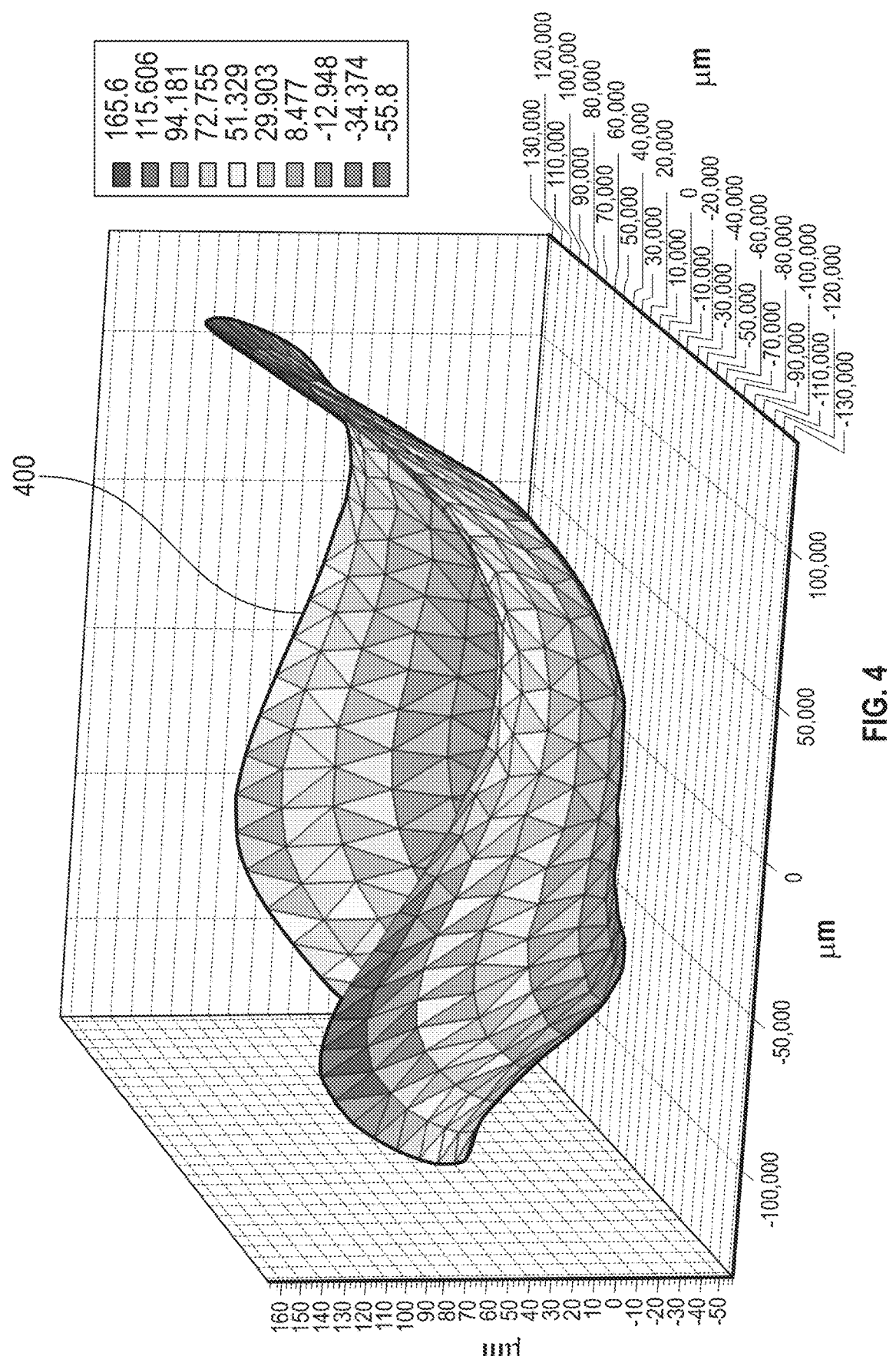
FIG. 4 is a graphical illustration of an example of a contour map of a substrate.

FIG. 4 is a graphical illustration of an example of a contour map 400 of a substrate. The contour map 400 of FIG. 4 is for a wafer having a diameter of 300 millimeters (mm) and a thickness of 780 micrometers (μm). The contour map 400 is a 2-dimensional map that depicts the tilt of the wafer in 3-dimensional space.

The control system 120 knows the location on the contour map of each image captured using the inspection camera 300. The control system 120 can determine a normal vector to a plane and determine an angle relative to the inspection camera 300, which is an angle of incidence. Using various techniques of this disclosure, the control system 120 can determine how light is reflected away and what kind of shading is created as a result for each given angle of incidence.

Using various techniques of this disclosure, and as described in more detail below, the control system 120 can generate a plurality of groups of images of a semiconductor substrate, such as the substrate 102 of FIG. 1, where each group of the plurality of groups of images is associated with a corresponding range of angles of incidence of a camera of the semiconductor substrate inspection system relative to the semiconductor substrate. For example, each group of the plurality of groups of images can be associated with a corresponding range of angles of incidence of the inspection camera 300 (of FIG. 3) of the metrology instrument 112 (of FIG. 1). The control system 120 can then determine a correction model for each pixel of an image and generate, using the correction model, a corrected image of the semiconductor substrate, which can reduce or eliminate PRNU.

Figure 5:
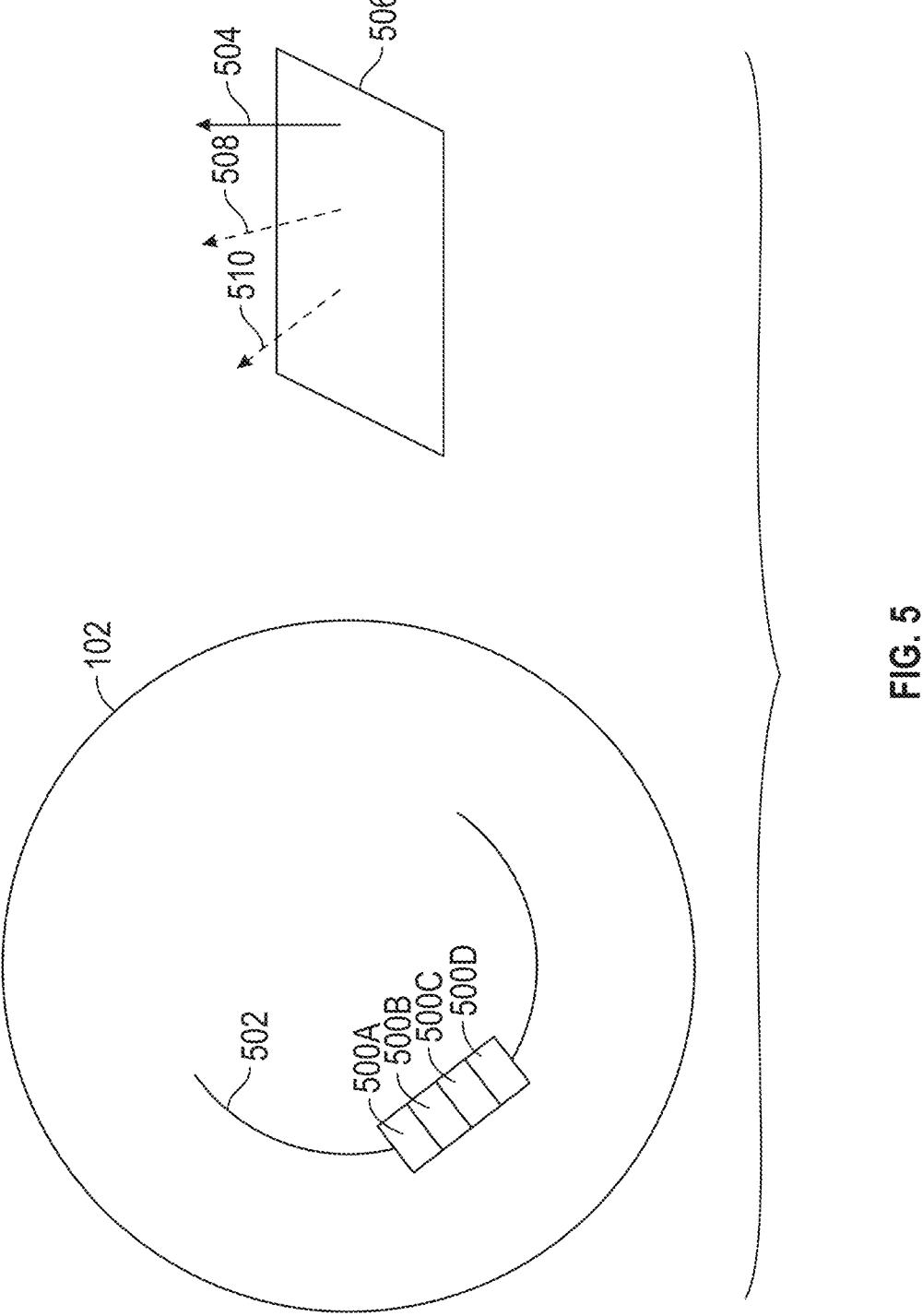
FIG. 5 is a conceptual diagram illustrating an example of images of a substrate acquired using an inspection camera.

FIG. 5 is a conceptual diagram illustrating an example of images of a substrate acquired using an inspection camera. An inspection camera, such as the inspection camera 300 of FIG. 3, can acquire images 500A-500D along a path 502, e.g., a circular path as the metrology instrument 112 of FIG. 1 spins the substrate 102.

The control system 120 can determine a normal vector 504 to a plane 506 to simulate the positioning of the inspection camera 300. Then, for each of the images 500A-500D, the control system 120 can determine an angle relative to the normal vector 504, which is an angle of incidence relative to the inspection camera 300.

In the conceptual diagram shown in FIG. 5, the control system 120 determined that the image 500A and the image 500B were associated with a vector 508 relative to the plane 506 having a first angle of incidence relative to normal vector 504. The control system 120 determined that image 500C and image 500D were associated with a vector 510 relative to the plane 506 having a second angle of incidence relative to normal vector 504, where the second angle of incidence is greater than the first angle of incidence associated with the image 500A and the image 500B.

FIG. 6 is a simulation depicting a scatterplot of angles of incidence for a substrate. The y-axis of the scatterplot 600 depicts the angle of incidence and the x-axis depicts the polar coordinate angle theta in degrees (0-360 degrees)

corresponding to a contour map of a substrate, such as corresponding to the contour map 400 of FIG. 4.

The control system 120 can group images associated with a corresponding range of angles of incidence. For example, referring to FIG. 5, the control system 120 can group the image 500A and the image 500B together in a first group and group the image 500C and the image 500D together in a second group. In a non-limiting example, the 360-degree range of the x-axis can be conceptually divided into four quadrants, such as shown in FIG. 8. In such an example, the control system 120 can group the image 500A and the image 500B together in one quadrant and the control system 120 can group the image 500C and the image 500D together in another quadrant.

FIG. 7 graphically depicts the polar coordinate angle theta. The polar coordinate angle theta is the angle between the angle of incidence and the vector normal to the substrate 102.

FIG. 8 is a conceptual drawing depicting an example of a grouping of polar coordinate angles. The field of view can be split into multiple areas. In the non-limiting example shown in FIG. 8, the field of view, e.g., a polar coordinate angle grouping 800, includes four areas, such as quadrants 0-3. If an angle of incidence vector falls within that area, e.g., quadrant, then all the images that fall within that area are grouped together. These areas, e.g., quadrants, act as an approximation for the angle of incidence, which can simplify computations performed by the control system 120. For example, because of the grouping, the control system 120 can later determine a third-order polynomial fit versus a fourth-order polynomial fit (or higher).

Figure 9:
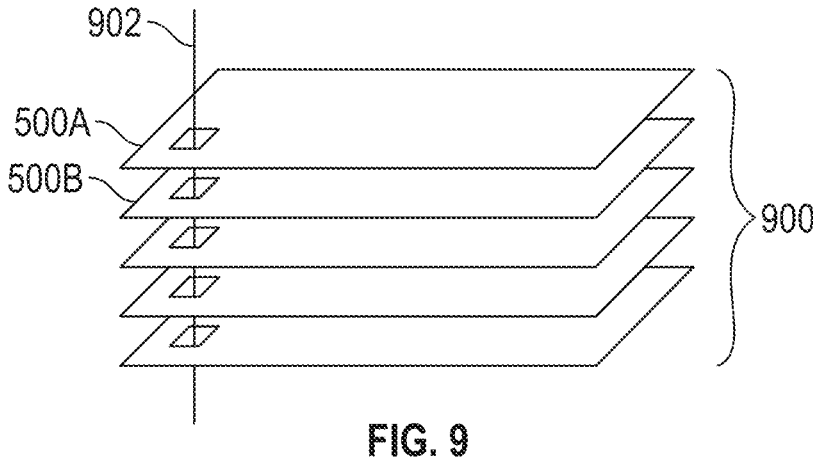
FIG. 9 is a conceptual drawing depicting an example of a group of images associated with a corresponding range of angles of incidence of a camera of a semiconductor substrate inspection system relative to the semiconductor substrate.

FIG. 9 is a conceptual drawing depicting an example of a group of images associated with a corresponding range of angles of incidence of a camera of a semiconductor substrate inspection system relative to the semiconductor substrate. A group of images can include one or more images. For example, the group 900 in FIG. 9 includes five images, including the image 500A and the image 500B of FIG. 5.

Each image has a plurality of pixels, such as two million pixels. A pixel 902 of the image 500A is shown in FIG. 9. Each pixel in the image has a grayscale value. Using the techniques of this disclosure, the control system 120 determines, for each pixel, a relationship between an angle of incidence and grayscale value, which is graphically shown in FIG. 10. The top image in the group 900, e.g., the image 500A, has an angle of incidence and the grayscale value at that angle of incidence for the pixel 902 in the image 500A is X. The next image in the group 900, e.g., the image 500B, has a different angle of incidence (but still grouped in same quadrant), and the grayscale value at that angle of incidence for the pixel 902 in the image 500B is Y, where the grayscale value Y can be different than the grayscale value X. The other images in the group 900 will similarly have grayscale values for corresponding pixels 902.

For each pixel 902 of an image in the group 900, the control system 120 can determine a correction model. For example, the control system 120 can apply linear regression techniques to determine a correction model. The linear regression generates coefficients for a polynomial, which represents a correction model. For example, for each pixel 902 of an image in the group 900, the control system 120 performs a third order polynomial regression fit. The resulting coefficients can then be used to calculate an expected grayscale value for the given angle of incidence.

The present inventor has recognized that, in some examples, it can be desirable for the control system 120 to perform the linear regression techniques in image form, rather than converting the images into corresponding numerical forms. Performing a polynomial linear regression on each pixel (e.g., two million pixels) can be computationally expensive. Therefore, to leverage the parallel capabilities of the CPU/GPU, the data can remain in image form and the linear regression can be performed on all two million pixels at the same time. The process can be thought of as multiplying and adding images instead of single scalar values.

For example, the control system 120 can multiply two images together and keep their product in another image, which can simplify the computations and therefor optimize the process. As a result, the linear regression can generate an A coefficient image, a B coefficient image, a C coefficient image, etc. for a polynomial, which can be used to determine a new image based on input that represents, for a given input angle, the correction model.

In this manner, the control system 120 generates a model of what every grayscale value should be for every pixel in the field of view for that particular angle of incidence. During runtime, the control system 120 can look at the angle of incidence associated with an image of a substrate and apply the correction model to the image to generate a corrected image of the substrate.

In some examples, the control system 120 can filter (or qualify) each group of the plurality of groups of images to determine a central tendency grayscale value for each pixel of the image. Filtering can help separate the artifacts of the substrate from the artifacts of the inspection system. For example, the control system 120 can group images of a substrate based on angles of incidence and then apply a filter, e.g., a median filter, to determine a nominal grayscale value, e.g., central tendency grayscale value, for each pixel of the image. The control system 120 can subtract the nominal grayscale value of the pixel from the grayscale value obtained using the correction model to generate a difference relative to the model. The control system 120 can subtract the nominal grayscale value of the pixel from each image in FIG. 9 to determine if a specific pixel value should be added to the model. As an example, if a pixel in image 500A is abnormally different than the "nominal", the control system 120 can reject that pixel in image 500A from the linear regression fit. In some examples, a given pixel can be deemed abnormal using a statistical threshold, such as two sigma. Not all pixels of all images in the group 900 will be used to generate the correction model. In this manner, the control system 120 can filter the content of each image before that image is allowed into the model.

Figure 10:
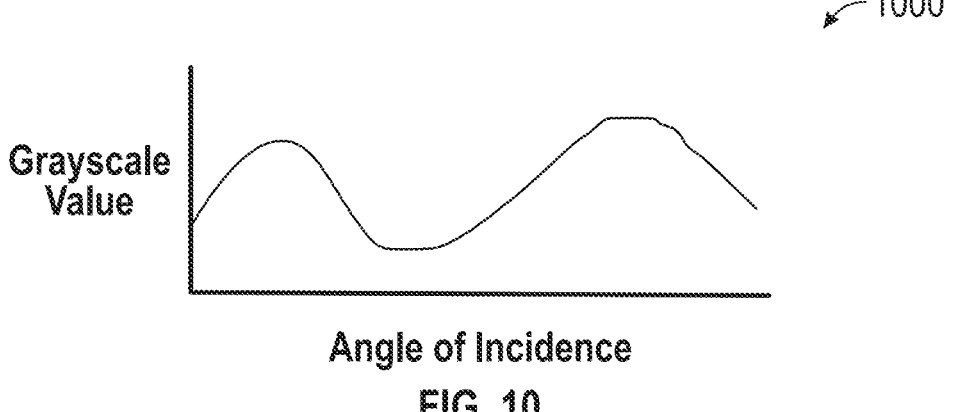
FIG. 10 depicts an example of a graph depicting a relationship between an angle of incidence and grayscale value for a particular pixel.

FIG. 10 depicts an example of a graph 1000 depicting a relationship between an angle of incidence and grayscale value for a single pixel for a quadrant or group. The x-axis represents the angle of incidence, and the y-axis represents the grayscale value. As seen in FIG. 10, the grayscale value changes as the angle of incidence changes.

Figure 11:
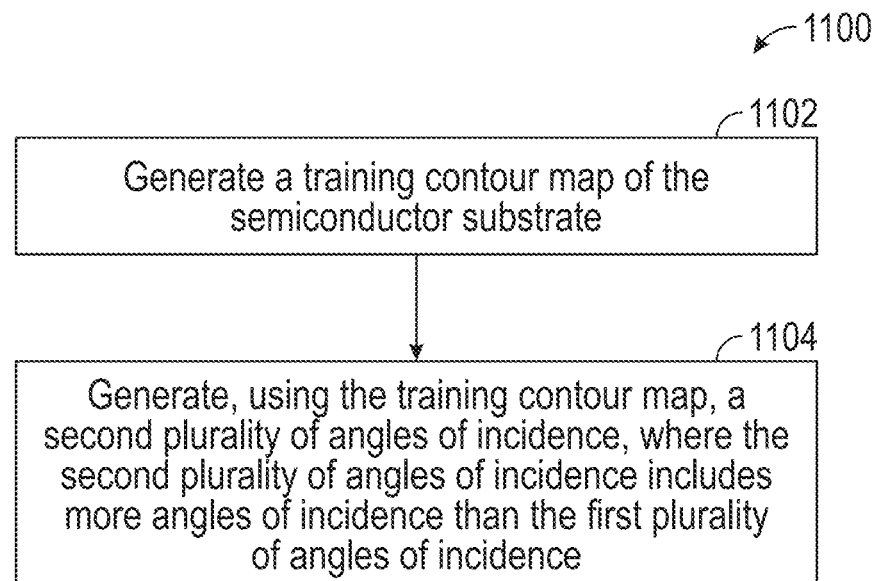
FIG. 11 depicts a flow diagram of an example of a method of training a correction model.

FIG. 11 depicts a flow diagram of an example of a method 1100 of training a correction model. Referring back to FIG. 6, the maximum angle of incidence shown is about 0.18. However, other substrates may have angles of incidence above 0.18. The present inventor has recognized that it can be desirable to induce all the angles of incidence up to a maximum angle of incidence that will be encountered by the control system 120. In this manner, the control system 120 can train a correction model.

For example, special tooling can be used to induce all the angles of incidence up to a maximum angle of incidence that will be encountered by the control system 120. As a non-limiting example, a shim can be positioned so as to induce the desired range of angles of incidence.

At block 1102, the method 1100 includes training the correction model by generating a training contour map of the semiconductor substrate. An example of a training contour map is shown in FIG. 12.

At block 1104, the method 1100 includes generating, using the training contour map, a plurality of angles of incidence, where the plurality of angles of incidence includes more angles of incidence than the plurality of angles of incidence determined from the substrate under inspection. An example of a scatterplot that depicts angles of incidence up to about 0.3 is shown in FIG. 13.

A system, such as one or portions of the fabrication system 100 of FIG. 1, can perform the techniques shown in FIG. 11.

Figure 12:
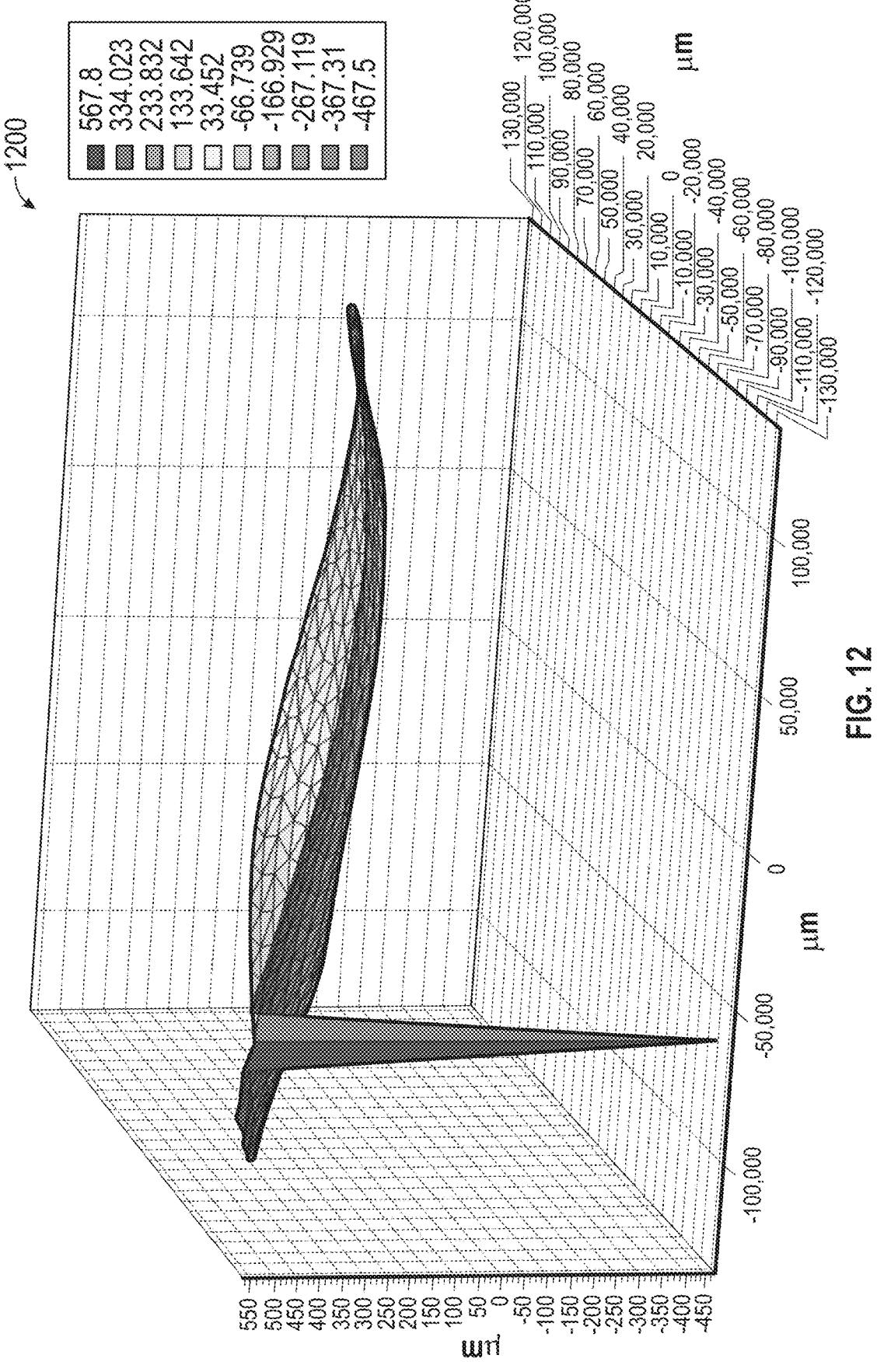
FIG. 12 is a graphical illustration of an example of a training contour map of a substrate.

FIG. 12 is a graphical illustration of an example of a training contour map 1200 of a substrate. The training contour map 1200 of FIG. 12 includes a wafer having a diameter of 300 millimeters (mm) and a thickness of 780 micrometers (μm) used in conjunction with special tooling, e.g., a shim, to induce a plurality of angles of incidence.

Figures 13, 14:
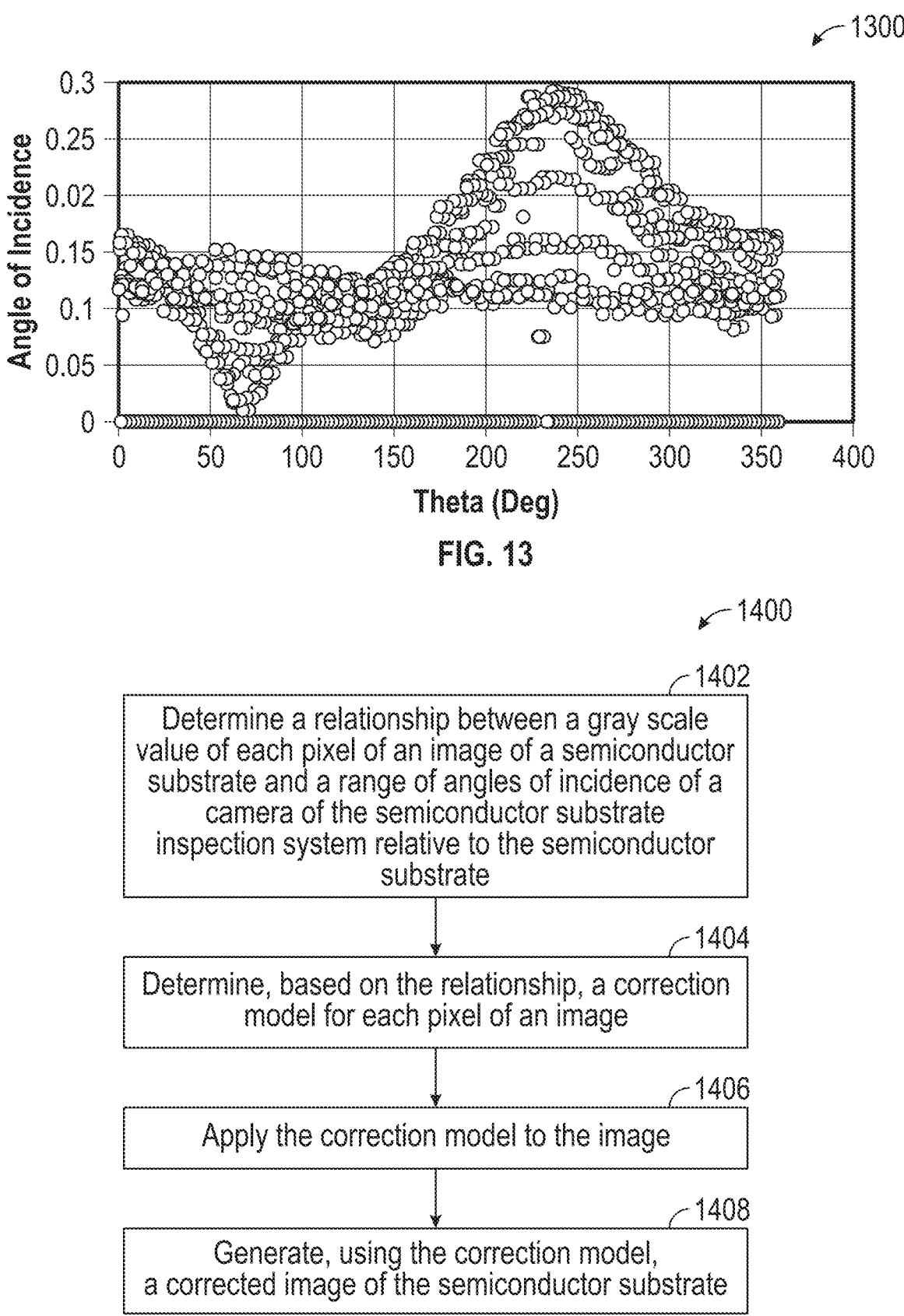
FIG. 13 is a simulation depicting a scatterplot of angles of incidence for the substrate and shim combination of FIG. 12.
FIG. 14 depicts a flow diagram of an example of a method of correcting a semiconductor substrate inspection system, in accordance with various techniques of this disclosure.

FIG. 13 is a simulation depicting a scatterplot of angles of incidence for the substrate and shim combination of FIG. 12. The y-axis of the scatterplot 1300 depicts the angle of incidence and the x-axis depicts the polar coordinate angle theta in degrees (0-360 degrees) corresponding to a training contour map, such as corresponding to the training contour map 1200 of FIG. 12. As seen in FIG. 13, angles of incidence were induced from 0 to about 0.3.

FIG. 14 depicts a flow diagram of an example of a method 1400 of correcting a semiconductor substrate inspection system, in accordance with various techniques of this disclosure. A system, such as one or portions of the fabrication system 100 of FIG. 1, can perform the techniques shown in FIG. 14.

At block 1402, the method 1400 includes determining a relationship between a grayscale value of each pixel of an image of a semiconductor substrate and a range of angles of incidence of a camera of the semiconductor substrate inspection system relative to the semiconductor substrate. At block 1404, the method 1400 includes determining, based on the relationship, a correction model for each pixel of an image. At block 1406, the method 1400 includes applying the correction model to the image. At block 1408, the method 1400 includes generating a corrected image of the semiconductor substrate.

FIG. 15 depicts a flow diagram of another example of a method 1500 of correcting a semiconductor substrate inspection system, in accordance with various techniques of this disclosure. A system, such as one or portions of the fabrication system 100 of FIG. 1, can perform the techniques shown in FIG. 15.

At block 1502, the method 1500 includes generating a plurality of groups of images of a semiconductor substrate, where each group of the plurality of groups of images is associated with a corresponding range of angles of incidence of a camera of the semiconductor substrate inspection system relative to the semiconductor substrate. At block 1504, the method 1500 includes determining a correction model for each pixel of an image. At block 1506, the method 1500 includes generating, using the correction model, a corrected image of the semiconductor substrate.

In addition to the techniques described above, the present inventor has recognized the desirability of determining a contour of a substrate using the grayscale values of the pixels in corresponding images of the substrate. The control system 120 determined a correction model using the techniques above and, as such, the control system 120 knows the angle of incidence and how the angle of incidence affects the grayscale value of a pixel of an image. The control system 120 can acquire an uncorrected image, such as the image 500A of FIG. 5, and for each pixel, determine an angle of incidence from the grayscale value of the corresponding pixel.

Using a relationship between the grayscale value of the image and the range of angles of incidence of a camera of the semiconductor substrate inspection system relative to the semiconductor substrate, the control system 120 can determine a contour of the substrate for that image. That is, the control system 120 can determine how the surface of the substrate was tilted for that image. For example, for each pixel of an image, the control system 120 can use the grayscale value of the pixel and apply the inverse of the correction model to determine the angle of incidence for that image, which can be used to determine the contour, e.g., tilt, of the substrate for that image.

By using these techniques, images acquired by the inspection camera, such as the inspection camera 300 of FIG. 3, can be used to determine the contours, e.g., tilt, instead of using a point sensor, such as the sensor 302 of FIG. 3. Using images acquired by an inspection camera can be much faster than using data acquired using a point sensor because the inspection camera has a field of view, unlike the point sensor. A flow diagram of an example of method is shown in FIG. 16.

FIG. 16 depicts a flow diagram of an example of a method 1600 of determining of a contour of a semiconductor substrate using a semiconductor substrate inspection system. A system, such as one or portions of the fabrication system 100 of FIG. 1, can perform the techniques shown in FIG. 16.

At block 1602, the method 1600 includes generating an image of the semiconductor substrate. For example, an inspection camera, such as the inspection camera 300 of FIG. 3 can generate an image, such as the image 500A of FIG. 5.

At block 1604, the method 1600 can include determining a grayscale value of each pixel of the image. For example, the control system 120 can determine a grayscale value of a pixel 902 of the image 500A of FIG. 9.

At block 1606, the method 1600 can include determining the contour, e.g., tilt, of the semiconductor substrate using a relationship between the grayscale value of the image and a range of angles of incidence of a camera of the semiconductor substrate inspection system relative to the semiconductor substrate. For example, the control system 120 can determine a contour, e.g., tilt, of each generated image 500A-500D, etc. and determine a contour, e.g., tilt, of the substrate 102 using all of the contours.

Various Notes

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspects, along with the full scope of equivalents to which such aspects are entitled.

What is claimed is:

1. A method of correcting an image of a semiconductor substrate inspection system, comprising:

generating a plurality of groups of images of a semiconductor substrate, wherein each group of the plurality of groups of images is associated with a corresponding range of angles of incidence of a camera of the semiconductor substrate inspection system relative to the semiconductor substrate during inspection of the substrate;

determining a correction model for each pixel of an image of the plurality of groups of images of the semiconductor substrate, wherein the correction model is configured to correct photo response non-uniformity (PRNU) of an image sensor based on a measurement of a three-dimensional contour of the substrate, wherein the correction model includes, for each pixel, an expected grayscale value for each corresponding angle of incidence determined from the three-dimensional contour, and wherein, during runtime, the angle of incidence associated with the image of the plurality of groups of images of the semiconductor substrate is used to select or compute a correction for each pixel using the correction model; and generating, using the correction model, a corrected image of the semiconductor substrate.

2. The method of claim 1, wherein determining the correction model for each pixel of the image includes:

determining, for each pixel, a relationship between a grayscale value of the pixel and a corresponding angle of incidence.

3. The method of claim 2, comprising:

determining a contour of the semiconductor substrate using the relationship between the grayscale value of the pixel of the image and the corresponding angle of incidence.

4. The method of claim 1, comprising:

filtering each group of the plurality of groups of images to determine a central tendency grayscale value for each pixel of the image.

5. The method of claim 1, comprising:

generating a contour map of the semiconductor substrate; and generating, using the contour map, a plurality of angles of incidence.

6. The method of claim 5, wherein the plurality of angles of incidence is a first plurality of angles of incidence, and wherein the correction model is trained by:

generating a training contour map of the semiconductor substrate; and generating, using the training contour map, a second plurality of angles of incidence, wherein the second plurality of angles of incidence includes more angles of incidence than the first plurality of angles of incidence.

7. The method of claim 1, wherein determining the correction model for each pixel of the image includes applying a linear regression.

8. The method of claim 7, wherein applying the linear regression includes applying the linear regression to the images in image form.

9. A semiconductor substrate inspection system, comprising:

a camera configured to generate a plurality of groups of images of a semiconductor substrate, wherein each group of the plurality of groups of images is associated with a corresponding range of angles of incidence of the camera of the semiconductor substrate inspection system relative to the semiconductor substrate; and a processor configured to:

determine a correction model for each pixel of an image of the plurality of groups of images of the semiconductor substrate, wherein the correction model is configured to correct photo response non-uniformity (PRNU) of an image sensor based on a measurement of a three-dimensional contour of the substrate, wherein the correction model includes, for each pixel, an expected grayscale value for each corresponding angle of incidence determined from the three-dimensional contour, and wherein, during runtime, the angle of incidence associated with the image of the plurality of groups of images of the semiconductor substrate is used to select or compute a correction for each pixel using the correction model; and generate, using the correction model, a corrected image of the semiconductor substrate.

10. The semiconductor substrate inspection system of claim 9, wherein the processor configured to determine the correction model for each pixel of the image is configured to:

determine, for each pixel, a relationship between a grayscale value of the pixel and a corresponding angle of incidence.

11. The semiconductor substrate inspection system of claim 10, wherein the processor is further configured to:

determine a contour of the semiconductor substrate using the relationship between the grayscale value of the pixel of the image and the corresponding angle of incidence.

12. The semiconductor substrate inspection system of claim 9, wherein the processor is further configured to:

filter each group of the plurality of groups of images to determine a central tendency grayscale value for each pixel of the image.

13. The semiconductor substrate inspection system of claim 9, wherein the processor is further configured to:

generate a contour map of the semiconductor substrate; and generate, using the contour map, a plurality of angles of incidence.

14. The semiconductor substrate inspection system of claim 13, wherein the plurality of angles of incidence is a first plurality of angles of incidence, and wherein the correction model is trained by:

generating a training contour map of the semiconductor substrate; and generating, using the training contour map, a second plurality of angles of incidence, wherein the second plurality of angles of incidence includes more angles of incidence than the first plurality of angles of incidence.

15. The semiconductor substrate inspection system of claim 9, wherein the processor configured to determine the correction model for each pixel of the image is configured to apply a linear regression.

16. The semiconductor substrate inspection system of claim 15, wherein the processor configured to apply the linear regression is configured apply the linear regression to the images in image form.

17. A semiconductor substrate inspection system, comprising:

means for generating a plurality of groups of images of a semiconductor substrate, wherein each group of the plurality of groups of images is associated with a corresponding range of angles of incidence of a camera of the semiconductor substrate inspection system relative to the semiconductor substrate during inspection of the substrate;

means for determining a correction model for each pixel of an image of the plurality of groups of images of the semiconductor substrate, wherein the correction model is configured to correct photo response non-uniformity (PRNU) of an image sensor based on a measurement of a three-dimensional contour of the substrate, wherein the correction model includes, for each pixel, an expected grayscale value for each corresponding angle of incidence determined from the three-dimensional contour, and wherein, during runtime, the angle of incidence associated with the image of the plurality of groups of images of the semiconductor substrate is used to select or compute a correction for each pixel using the correction model; and means for generating, using the correction model, a corrected image of the semiconductor substrate.

18. The semiconductor substrate inspection system of claim 17, wherein the means for determining the correction model for each pixel of the image includes:

means for determining, for each pixel, a relationship between a grayscale value of the pixel and a corresponding angle of incidence.

19. The semiconductor substrate inspection system of claim 18, comprising:

means for determining a contour of the semiconductor substrate using the relationship between the grayscale value of the pixel of the image and the corresponding angle of incidence.

20. The semiconductor substrate inspection system of claim 17, comprising:

means for filtering each group of the plurality of groups of images to determine a central tendency grayscale value for each pixel of the image.

* * * * *